March 18, 1941.  W. H. TEMME  2,235,691
TIRE CHAIN APPLYING DEVICE
Filed March 11, 1939
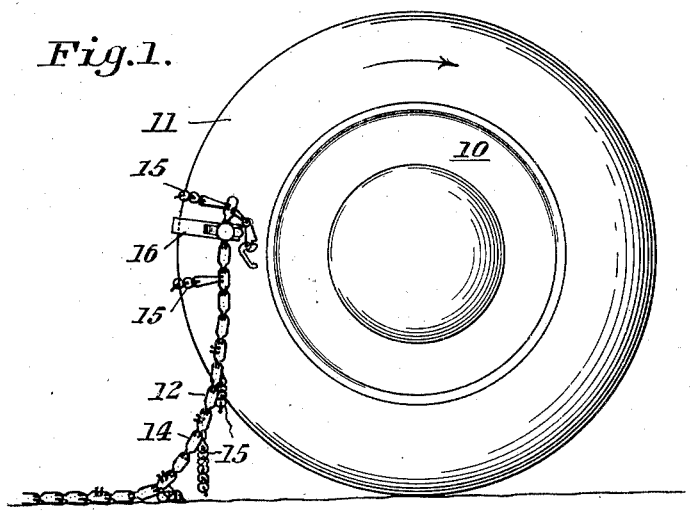
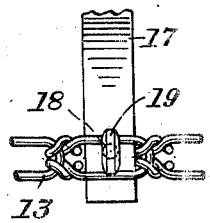
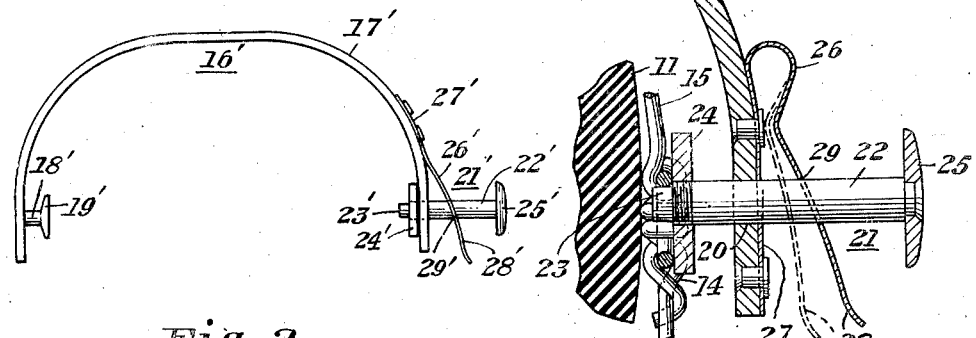
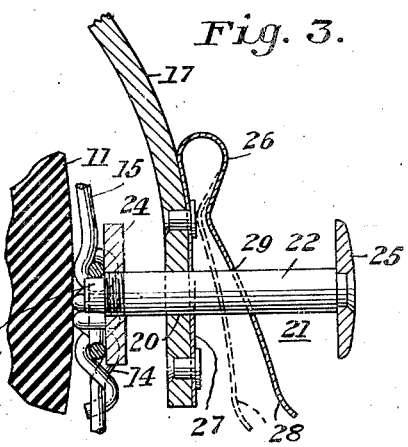
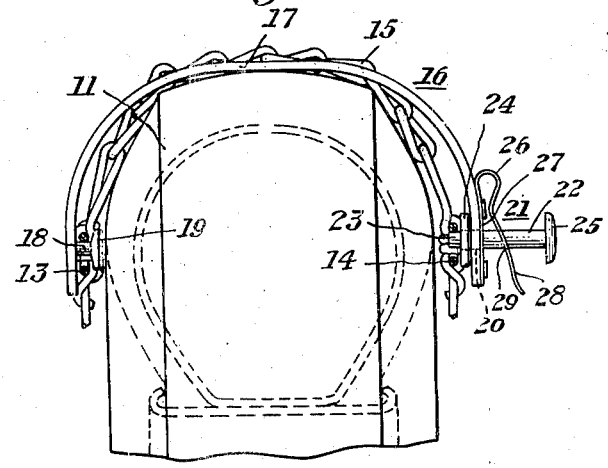
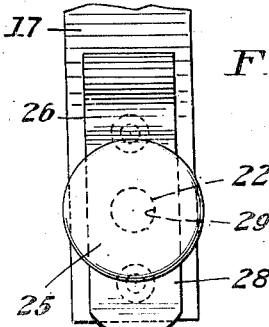
INVENTOR
William H. Temme
ATTORNEYS Patented Mar. 18, 1941

2,235,691

UNITED STATES PATENT OFFICE 2,235,691

TIRE CHAIN APPLYING DEVICE

William H. Temme, New Kensington, Pa.

Application March 11, 1939, Serial No. 261,213

1 Claim. (Cl. 81—15.8)

This device relates to a tire chain applying device, the primary object of the invention being to provide a device for temporarily holding one end of a tire chain in position on a vehicle tire, while the chain is being wrapped around the tire by the rotation of the tire. After the chain has been positioned around the tire, the ends of the chain are brought together and fastened to each other in any acceptable manner.

A further object of the invention is to provide a device which is simple in construction and operation, inexpensive to make and which can be readily placed on or removed from an automobile tire and which will not injure the tire in its use.

Another object is to provide a rugged device which may be employed to apply chains evenly around a tire as the wheel is rotated, which may be operated without lifting the wheel from the ground, and which may be used with various sizes of tires.

Still another object of my invention is to produce a unique clamp which will permit a member to be readily movable in one direction and rigidly held against movement in the opposite direction, the clamp being releasable so that clamp member can be readily moved in either direction.

These and other objects are obtained by means, the preferred embodiment of which is illustrated in the accompanying drawing in which:

Figure 1 is a side elevation of a vehicle tire and wheel showing my improved device attached to the tire in the initial position of applying a tire chain on the tire;

Figure 2 is an edge view of the tire showing the device in position on the tire and just before the device is clamped;

Figure 3 is a sectional view of one end of the device, but to an enlarged scale;

Figure 4 is a view in elevation of the same end of the device illustrated in Figure 3 and to the same scale;

Figure 5 is a view in elevation of one end of the device showing a fastening lug and a portion of the tire chain; and Figure 6 is an elevation of a modification of the device.

Referring now to the drawing in detail, the reference numeral 10 designates the wheel of an automobile on which a tire 11 is mounted, to which tire it is desired to secure the tire chain or anti-skid chain 12. The tire chain 12 comprises two side chains 13 and 14, which are disposed around the sides of the tire, and cross chains 15, the ends of which are attached to the side chains and span the tire tread at intervals.

The device or tool 16 comprises essentially an arcuate body member or strap 17 constructed of a length of rigid metal which is given the shape of an arch, of such dimensions as to reach transversely around the tire from one side to the other. At one end of the member 17 there is provided an inwardly extending chain engaging stud or lug 18 which has an enlarged rectangular end portion 19, the long axis of which is parallel to the axis passing lengthwise from end to end through the body member 17. The long side of the end portion 19 is of a dimension which will readily pass through the lengthwise opening of one of the links of the side chain 13. The lug 18 is preferably made of a length such that the inner end of portion 19 will not bear against the tire walls. This will cause the side chain itself to be forced against and strongly grip the walls of the tire. There will be no tendency for the tire wall to be torn or injured by the contact of the lug 18 against it.

The other end of the member 17 has an opening 20 through which projects a suitable fastening member or clamping pin 21 which is slidably received in the opening 20. The lug 18 and the pin 21 are in transverse alignment. The fastening member or pin 21 has a stem 22 which is rounded at the inner end 23. Spaced from the end 23, at a distance sufficient to receive the side chain 14, but not sufficient to allow the end 23 to bear against the side wall of the tire, is a shoulder 24 secured to the stem 22. The shoulder bears against the side chain 14 and forces it against the tire to strongly grip the side walls and thus the end 23 is not forced into contact with the tire wall. The outer end of the stem has secured thereto an enlarged head 25.

Secured to the body member 17 and adjacent the end through which the clamping pin 21 slides is a U-shaped spring member 26 having a fixed leg 27 which is fastened to the member 17, for example, by riveting and a movable leg 28 which projects outwardly and is directed angularly away from the member 17. The movable leg 28 has an opening 29 through which the stem 22 of the pin 21 passes. The opening 29 is shaped so that when the movable leg 28 is moved toward the member 17 to the position shown in dotted lines in Figure 3, the stem 22 slides freely through the opening 29, but when the movable leg 28 is away from the member 17, the stem 22 is securely held against outward movement but permits inward movement of the pin 22, that is, toward the stud 18.

In Figure 6 there is shown another embodiment of my invention. In this drawing the various parts heretofore described in connection with Figures 1 through 5 are designated by the same numerals with a prime suffix. In this device the spring member 26' has a fixed leg 27' which extends along the member 17' away from the end and the movable leg 28' extends in the opposite direction outwardly and angularly away from the member 17'. The portion 27' of the spring member 26' lying along the member 17' is secured thereto by suitable means such as riveting. The opening 29' cooperates with the stem 22' in the same way as does the opening 29 in leg 28, shown in Figures 2 and 3.

To use the device 16 one of the links adjacent the end of the side chain 13 is engaged by the stud 18 while a corresponding link on the side chain 14 is engaged by the inner end 23 of the fastening pin 21. The tool 16 is then placed to partly encircle the tire at a suitable position, preferably at the rear, as shown in Figure 1 and the fastening pin 21 is pressed inwardly so that the end 23 thereof enters a side link and the shoulder 24 forces the side chain 14 firmly against one side of the tire 11 while the side chain 13 is forced into engagement with the opposite side of the tire. The wheel 10 is then rotated in the direction of the arrow and the chain is wound around the tire in the usual manner. After the chain is fully wound on the tire, the ends of the chain are secured together by any suitable fastening device. The tool is then removed by forcing the free lug 28 of the spring 26 toward the member 17, whereupon the pin 21 can be readily moved to a position clear of the tire and the tool is then disengaged from the side chains and removed from the tire.

While I have illustrated and described the present preferred embodiment of my invention, it will be understood that the description is by way of example only and that the invention may be otherwise embodied or practiced within the scope of the following claim.

I claim:

A device for attaching tire chains having side chains and cross chains to a tire, which device comprises an arcuate body member adapted to span a tire, a tire-chain engaging stud projecting inwardly from the inner face of one end of the member, a clamping pin projecting inwardly from the other end of the member and oppositely disposed relative to the stud, said stud being of a height which is less than the thickness of the side chain and of dimensions less than the openings in the side chains, said clamping pin having an end which is of such dimensions that it may be received in the openings in the side chains and having a chain-engaging shoulder thereon spaced from the inner end of the pin a distance which is less than the thickness of the side chain, and means for releasably holding the pin rigidly against sliding movement in a direction away from the said stud only, said means comprising a leaf spring having a fixed leg fastened to the body member and a free leg which extends along and angularly away from the body member and has therein an opening through which the clamping pin passes, the arrangement being such that when the free leg is in position near the body member the pin can readily be moved toward or from the stud but when the free leg is distant from the body member the pin is freely movable toward the stud but immovable away from the stud.

WILLIAM H. TEMME.